US012109705B2

(12) United States Patent
Xu et al.

(10) Patent No.: US 12,109,705 B2
(45) Date of Patent: Oct. 8, 2024

(54) RECHARGING CONTROL METHOD OF DESKTOP ROBOT (71) Applicant: AMICRO SEMICONDUCTOR CO., LTD., Guangdong (CN)

(72) Inventors: Dengke Xu, Guangdong (CN); Gangjun Xiao, Guangdong (CN); Weibing Zhao, Guangdong (CN)

(73) Assignee: AMICRO SEMICONDUCTOR CO., LTD., Guangdong (CN)

( * ) Notice: Subject to any disclaimer, the term of this patent is extended or adjusted under 35 U.S.C. 154(b) by 486 days.

(21) Appl. No.: 17/598,910

(22) PCT Filed: Nov. 9, 2019

(86) PCT No.: PCT/CN2019/116898
§ 371 (c)(1),
(2) Date: Sep. 28, 2021

(87) PCT Pub. No.: WO2020/199589
PCT Pub. Date: Oct. 8, 2020

(65) Prior Publication Data
US 2022/0161430 A1 May 26, 2022

(30) Foreign Application Priority Data
Mar. 30, 2019 (CN) .......................... 201910253920.7

(51) Int. Cl.
B25J 9/16 (2006.01)
B25J 13/06 (2006.01)
(Continued)

(52) U.S. Cl.
CPC ............... B25J 9/1664 (2013.01); G06T 7/73 (2017.01); G06V 10/751 (2022.01); G06V 20/50 (2022.01);
(Continued)

(58) Field of Classification Search
CPC . B25J 9/162; B25J 9/163; B25J 9/1656; B25J 9/1661; B25J 9/1664; B25J 9/1666;
(Continued)

(56) References Cited

U.S. PATENT DOCUMENTS

| 2002/0153185 A1 | 10/2002 | Song et al. |
| 2006/0136096 A1 | 6/2006 | Chiappetta et al. |

(Continued)

FOREIGN PATENT DOCUMENTS

| CN | 105119338 A | 12/2015 |
| CN | 105928505 A | 9/2016 |

(Continued)

OTHER PUBLICATIONS

Translation of CN-108594825-A.*

(Continued)

Primary Examiner — Russell Frejd
Assistant Examiner — Sara J Lewandroski
(74) Attorney, Agent, or Firm — Samson G. Yu (57) ABSTRACT A recharging control method of a desktop robot is provided. The desktop robot includes a robot body provided with a camera and a base. The recharging control method includes the following steps. When the robot body of the desktop robot receives a charging instruction, images of the desktop environment are collected, the collected two continuous frames of images are controlled to be subjected to feature matching, the position variation of the robot body is calculated, and then a corresponding grid map is constructed (step A); a wireless beacon modulated and transmitted by the base is received, and initial orientation of the base is analyzed according to strength information of the wireless beacon (step B); a recharging path is planned in combination with the change of the position of the robot body and the initial orientation obtained through analysis (step C); the robot (Continued)

body of the desktop robot is controlled to move along the recharging path (step D); when the strength of the wireless beacon is within a preset threshold range, the collected two continuous frames of images are controlled to be subjected to feature matching, then a vector value of the current position of the robot body is calculated, and further, the base is further searched for completing docking and charging (step E).

7 Claims, 4 Drawing Sheets

(51) Int. Cl.
　　*G06F 3/14*　　　(2006.01)
　　*G06K 9/00*　　　(2022.01)
　　*G06T 7/73*　　　(2017.01)
　　*G06T 11/00*　　　(2006.01)
　　*G06V 10/75*　　　(2022.01)
　　*G06V 20/50*　　　(2022.01)
　　*H02J 7/00*　　　(2006.01)
　　*H04B 17/318*　　(2015.01)

(52) U.S. Cl.
　　CPC ........ *H02J 7/00032* (2020.01); *H04B 17/318* (2015.01)

(58) Field of Classification Search
　　CPC ...... B25J 9/1676; B25J 9/1684; B25J 9/1694; B25J 9/1697; H04B 17/318; G06T 7/70; G06T 7/73; A47L 9/2873; A47L 2201/00; A47L 2201/02; A47L 2201/022; A47L 2201/04; G01C 21/005; G01C 21/12; G01C 21/14; G01C 21/165; G01C 21/20; G01C 21/206; G01C 21/28; G01C 21/30; G01C 21/32; H04W 4/33; H04W 4/38; H04W 4/44; G01S 5/00; G01S 5/02; G01S 5/0205; G01S 5/0242; G01S 5/0257; G01S 5/0263; G01S 5/0284; G01S 5/0289; G01S 5/0294; G01S 5/14; G01S 5/145; G01S 5/16; G06V 10/74; G06V 10/75; G06V 10/751; G06V 10/757; G06V 10/758; G06V 10/759; G06V 20/50; G05D 1/246; G05D 1/2462; G05D 1/2646; G05D 1/247; G05D 1/249; G05D 1/0276; G05D 1/028
　　See application file for complete search history.

(56) References Cited

U.S. PATENT DOCUMENTS

| | | |
|---|---|---|
| 2008/0273791 A1 | 11/2008 | Lee et al. |
| 2013/0073088 A1 | 3/2013 | Lee et al. |
| 2016/0291595 A1 | 10/2016 | Halloran et al. |
| 2017/0336786 A1 | 11/2017 | Chen et al. |
| 2018/0098676 A1 | 4/2018 | Ryu et al. |
| 2019/0124470 A1* | 4/2019 | Jiang .............. H04W 4/023 |

FOREIGN PATENT DOCUMENTS

| | | | | |
|---|---|---|---|---|
| CN | 107992061 A | | 5/2018 | |
| CN | 108012326 A | | 5/2018 | |
| CN | 108061886 A | * | 5/2018 | ............. G01S 11/06 |
| CN | 108303984 A | | 7/2018 | |
| CN | 108594825 A | * | 9/2018 | .......... G05D 1/0214 |
| CN | 108733048 A | | 11/2018 | |
| CN | 109471442 A | | 3/2019 | |
| CN | 109901590 A | | 6/2019 | |
| JP | 4547594 B2 | | 9/2010 | |
| WO | 2018043981 A1 | | 3/2018 | |

OTHER PUBLICATIONS

Translation of CN-108061886-A.*
English Translation on CN-108061886-A (2018).*
English Translation of CN-108594825-A (2018).*
Luo,Zhenhua, Research on Indoor Navigation Algorithm and Autonomous Charging System of Service Robot in Hospital, Feb. 15, 2017, p. 1-p. 62.

* cited by examiner

Fig. 5

RECHARGING CONTROL METHOD OF DESKTOP ROBOT

CROSS-REFERENCE TO RELATED APPLICATIONS

The present disclosure takes the Chinese Patent Application No. 201910253920.7, filed on Mar. 30, 2019, and entitled "Recharging Control Method of Desktop Robot", as the priority, the entire contents of which are incorporated herein by reference.

TECHNICAL FIELD

The disclosure belongs to the technical field of recharging of robots, and particularly relates to a recharging control method of a desktop robot.

BACKGROUND

An intelligent miniature desktop robot is a 3C robot product integrating multiple interaction modes such as voice interaction, remote control and communication, scientificity, novelty, advancement, practicability and completeness are realized, man-machine interaction is realized through voice interaction, networked real-time interaction and the like, then the problem of 'city diseases' existing in the current society may be changed, meanwhile, through a brand-new man-machine interaction mode, people may conveniently use and operate electronic products, and therefore, the life of people is further facilitated.

The recharging mode of the intelligent miniature desktop robot is an important guarantee for continuous work of the intelligent miniature desktop robot, the identification and alignment range of a recharging seat of the desktop robot is very small, the desktop robot may complete identification and alignment only in the very small range of the position where the recharging seat is located, and finally, recharging work is completed. When the desktop robot is switched to the recharging mode, two situations exist: the first situation is that the desktop robot completes covering and mapping work, under the situation, the desktop robot marks the position of the recharging seat in advance in the process of covering a desktop area, at the moment, recharging of the desktop robot is realized through navigation planning of a recharging path, and then the recharging seat is identified to complete the alignment and charging work; and the other situation is that the desktop robot does not complete covering and mapping when switched to the recharging mode, at the moment, the desktop robot does not know the position of the charging seat completely, and at the moment, recharging completion becomes a probabilistic event. Due to the fact that a closed obstacle or a signal emission source in a household appliance exists in the environment where the desktop is located, a recharging guide signal of the desktop robot is likely to be interfered or shielded, and thus the recharging efficiency is affected. Moreover, seat searching and returning time is set for some desktop robots, and if the recharging seat is not found within a certain time duration, searching is abandoned, so that recharging fails.

In a recharging mode, a recharging path needs to be planned by using a positioning technology for docking with the charging seat to complete charging, a wireless signal positioning technology is generally used for completing recharging guide of the desktop robot, the positioning technology is used for calculating distance information through a distance measurement algorithm according to a received wireless signal strength value, and then position information of a carrier is obtained. Therefore, wireless signal positioning has the advantages of low cost, simple setting and the like, but the wireless positioning technology is easily affected by the complex indoor environment, such as multipath effect and shielding of a shielding object, for example, in the positioning process of Received Signal Strength Indication (RSSI) technology, the adopted precision may not meet the requirement for stable recharging, and signals are easily interfered; and ultrasonic waves are greatly affected by a multipath effect and non-line-of-sight propagation, and the defect that people and objects may not be identified exists. In a comprehensive view, the existing method is single in technology and lacks a fusion idea; and the precision is generally low. Meanwhile, wireless signals are random and accidental, the stability is poor, and the wireless docking efficiency of the desktop robot and the charging seat of the desktop robot is reduced.

SUMMARY

In order to overcome the technical defects, the disclosure provides the following technical solution.

A recharging control method of a desktop robot is provided. The desktop robot includes a robot body provided with a camera and a base integrating charging and wireless beacon transmitting modulating functions. The recharging control method is characterized by including the following steps. In step A, when the robot body of the desktop robot receives a charging instruction of a recharging mode, the camera is called to collect images of the desktop environment, the collected two continuous frames of images are controlled to be subjected to feature matching, position variation of the robot body is calculated, and then a corresponding grid map is constructed; in step B, the robot body of the desktop robot is controlled to receive a wireless beacon modulated and transmitted by the base, and initial orientation of the base is analyzed according to strength information of the wireless beacon; in step C, a recharging path is planned in the grid map in combination with the change of the position of the robot body and the initial orientation obtained through analysis; in step D, the robot body of the desktop robot is controlled to move along the recharging path; and in step E, when the received strength of the wireless beacon is within a preset threshold range, the collected two continuous frames of images are controlled to be subjected to feature matching, then a vector value of current position of the robot body is calculated, and further, the base is further searched according to the vector value. A signal source for transmitting the wireless beacon is arranged on the base, and the preset threshold range is 80%-90% of the maximum value of the signal strength of the wireless beacon transmitted by the signal source; and the two continuous frames of images are images of the same object on imaging planes of the camera at different visual angles. Compared with the prior art, according to the technical solution, the image feature information collected by the camera is fused with the strength information of the wireless beacon to adjust and correct the recharging path, then the accumulated error of a single navigation technology is reduced, the image feature cooperates with the strength information of the wireless beacon to reduce the interference of the desktop environment, and the accuracy and the fitness of a navigation algorithm are improved. The map is constructed by combining with the constraint relation between the images of the same object in the camera at different visual angles, the recharging direction is determined to eliminate an obstacle, meanwhile, the recharging path is corrected by utilizing the wireless signal strength information, then the time for searching the recharging seat is further shortened, and the recharging success rate of the robot body of the desktop robot in a small area range is improved.

Further, in the step A and the step E, the feature matching includes the operations that center points of the images collected by the camera are selected to serve as feature points of environment images, feature descriptor matching is carried out on the feature points and environment images in a desktop map database built in the desktop robot, the images with the maximum matching degree are found, the desktop map database stores environment image feature descriptors corresponding to all positions and circle center positions on a recharging circumference with center of the base as a circle center and the predetermined length as radius on the desktop where the robot body moves, and desktop coordinate values measured in advance in an actual environment. According to the feature matching method, the range where feature matching of environment images needs to be conducted is drawn close to the base, thus the searching area range of the base is narrowed, the follow-up planned path is further prevented from appearing at the edge position of the desktop, and the robot body of the desktop robot is effectively prevented from falling off at the edge position of the desktop.

Furthermore, the operation that position variation of the robot body is calculated, and then a local map corresponding to the actual environment in the image is constructed includes the following steps. Feature points of the collected two continuous frames of images are subjected to feature matching to obtain two environment images with the maximum matching degree, and desktop coordinate values of the actual environments corresponding to the two environment images are extracted from the desktop map database; the position change of the robot body is calculated according to the extracted desktop coordinate values, and then a local binary map corresponding to the actual terrain is established; and in an off-line working mode, the local binary map is marked to obtain the grid map. The feature points of the collected two continuous frames of images are used for locating, the local binary map is established, accurate positioning is realized at the local end, and path planning is facilitated.

Furthermore, the operation that the recharging path is planned in the grid map further includes the following steps. The camera is called to collect images in the initial orientation, and strength information of the wireless beacon received by the robot body of the desktop robot is monitored in real time; feature matching is carried out with an obstacle landmark image built in the desktop map database, and then whether an obstacle exists or not is judged; when an obstacle exists in the initial orientation, a recharging path which bypasses the obstacle and moves to the base along the gradient distribution direction of the signal strength of the wireless beacon is planned in the grid map by taking the current position as a starting point and the initial orientation as a forward direction; and the obstacle landmark image is further stored in the desktop map database. With the technical scheme, the robot body of the desktop robot may be controlled to find the base more accurately and quickly.

Furthermore, in the recharging path, the gradient distribution of the signal strength of the wireless beacon is in gradient enhancement. The planning method of the recharging path is simplified, the searching time is further shortened, and the recharging success rate of the desktop robot is improved.

Furthermore, in step E, the operation that a vector value of the current position of the robot body is calculated includes the following steps. After the images with the maximum matching degree are obtained in the feature matching process of the collected continuous two frames of images, a homography matrix of the collected continuous two frames of images is calculated according to the feature points of the images with the maximum matching degree and internal parameters of the camera; according to constraint relation corresponding to the homography matrix, the coordinate values of the feature points of the collected continuous two frames of images are unitized into the same coordinate system; and distance between the robot body of the desktop robot and the corresponding position on the recharging circumference when the current environment images are acquired is calculated according to pinhole imaging principle and the coordinate values in combination with the homography matrix and internal parameters of the camera, and further the vector value of the current position of the robot body is calculated. According to the technical solution, the mapping relation of one point under the same plane in the actual environment under the two imaging planes of the moving camera is analyzed, so that two continuously collected images are converted to the same visual angle and then superposed together to be conveniently marked in the same grid map; and precise positioning operation of the desktop robot is completed within the error allowable range of the image resolution.

Furthermore, in step B, specifically, the robot body of the desktop robot is controlled to perform autorotation, and meanwhile, the wireless beacon modulated and transmitted by the base is received; strength information of the wireless beacon in each direction in autorotation process is analyzed, and wireless beacon signals with RSSI value smaller than 50 dBm are filtered out; direction information with the maximum strength in the wireless beacon is acquired, and the initial orientation of the base relative to the robot body of the desktop robot is obtained through analyzing; and the strength information of the wireless beacon includes the RSSI value. When RSSI technology is used for positioning, the distance from the node determines the precision of RSSI wireless positioning, which is just suitable for recharging path planning of the desktop robot in a small range area of the desktop, and the base searching efficiency of the wireless beacon is improved.

DETAILED DESCRIPTION OF THE EMBODIMENTS

The technical solutions in the embodiments of the disclosure will be described in detail below with reference to the accompanying drawings in the embodiments of the disclosure.

The research directions for indoor positioning technologies are many, although each indoor positioning technology has own advantages, certain limitation exists when a single technology is adopted in a complex and changeable indoor environment, and therefore, no technology may realize accurate indoor positioning. The development trend of indoor positioning technologies at present is to integrate multiple technologies, and make up the defects of a single technology by fully utilizing the advantages of other technologies, so that a better positioning effect is realized. In the relevant art, a recharging path planning system is poor in stability and low in reliability, the stability of the whole recharging system is reduced only through a unique identifiable signal guiding pairing method of a charging seat and a sensor terminal of a mobile robot, fixed obstacles may not be eliminated to plan a more convenient track, and thus recharging failure is caused.

The embodiment of the disclosure provides a recharging control method of a desktop robot, the recharging control method is applied to an automatic desktop mobile robot, the desktop robot includes a robot body provided with a camera and a base integrated with charging and wireless beacon transmitting modulating functions, after the desktop robot is placed on a desktop of a user, the shape, length and width of the desktop, and images and position coordinate information of all directions of the desktop may be input in advance through a mobile terminal, so that the robot body of the desktop robot obtains the information which becomes standard sample data of a built-in database. The base is used as a charging pile of the desktop robot; and the charging pile is arranged on the outer side of the robot body and connected with the bottom of the robot body during docking charging. The base includes a wireless communication module configured to modulate transmitting of wireless beacons to realize recharging positioning of the desktop robot. The interaction between the robot body and the base is matched with image feature points collected by the camera, so that self-planning of a recharging path is completed, and high-precision and high-efficiency wireless guide recharging is realized.

Figure 1:
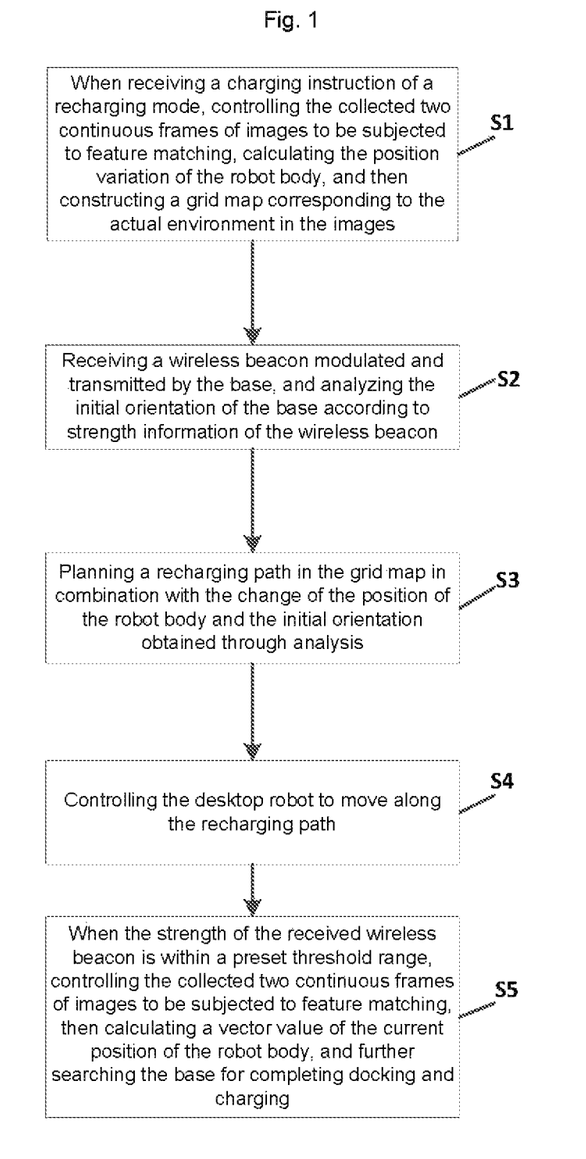
FIG. 1 is a flowchart of a recharging control method of a desktop robot according to an embodiment of the disclosure.

The embodiment of the disclosure provides a recharging control method of a desktop robot, as shown in FIG. 1, the recharging control method includes the following steps.

In S1, when the robot body of the desktop robot receives a charging instruction of a recharging mode, the camera is called to collect images of the desktop environment, the collected two continuous frames of images are controlled to be subjected to feature matching, namely, feature points of the two frames of images are selected, two images with the highest feature point matching degree are selected from a built-in database, actual positions corresponding to the two images are identified, position information of the two actual positions in a built-in virtual map and a relative vector relationship between the two positions are established, then the change of the position of the robot body may be calculated, and a grid map corresponding to the actual environment in the images is constructed by adopting the technical means of real-time positioning and synchronous map construction.

In S2, the robot body of the desktop robot is controlled to receive a wireless beacon modulated and transmitted by the base, the orientation of the base is analyzed according to strength information of the wireless beacon to be taken as initial orientation on a recharging path, specifically, the orientation feature of the position, with the maximum signal strength, of the wireless beacon relative to the current position of the robot body of the desktop robot is determined, and then the orientation of the base relative to the robot body is analyzed to serve as the initial orientation.

In S3, a recharging path is planned in the grid map in combination with the change of the position of the robot body and the initial orientation obtained through analysis; in the recharging path planning process, the camera on the desktop robot body collects image data of the desktop environment in real time, and target feature locking and obstacle path prediction of the base are completed through cooperation and guidance of strength information of the wireless beacon on the level of a vision library technology and a machine vision technology.

In S4, a built-in Mcmt of the desktop robot receives t image data of the desktop environment collected by camera in real time and carries out matching processing on the planned path, and then robot body is driven to move along the recharging path by controlling a driving device. According to the embodiment of the disclosure, feature matching is carried out by means of every two frames of collected images, the position distance information of the robot body of the desktop robot is determined, meanwhile, the peripheral desktop environment information of the robot body is determined, so that the grid map is constructed and grid information is marked, the current position and the recharging path of the robot body of the desktop robot are further predicted and planned, therefore, the robot body of the desktop robot completes recharging in the actual desktop environment along the planned path in the map.

In S5, when the received strength of the wireless beacon is within a preset threshold range, the collected two continuous frames of images are controlled to be subjected to feature matching, then a vector value of the current position of the robot body is calculated, and the base is further searched according to the calculated vector value. When the distance between the robot body of the desktop robot and the base is smaller than or equal to the coverage area where the base transmits the recharging signal, the received strength of the wireless beacon is within a preset threshold range, at the moment, the desktop robot does not detect the base provided with a wireless beacon transmitting source accessory, but the searching area of the robot body on the grid map is narrowed, then the recharging path continues to be planned under the control of a visual matching algorithm, and the robot body of the desktop robot is gradually guided to find the precise position of the base so as to realized docking and complete charging.

It is to be noted that in the embodiment, the robot body of the desktop robot includes a processor and a beacon receiving device, the processor is electrically connected with the camera, and the camera converts collected image data into electric signals and transmits the electric signals to the processor for image processing; and the processor is electrically connected with the beacon receiving device, and is configured to process the signal strength information received by the beacon receiving device and a unique identification code of the base, and carry out recharging instruction interaction with the base by virtue of the beacon receiving device. In the embodiment, a signal source for transmitting the wireless beacon is arranged on the base, and the preset threshold range is 80%-90% of the maximum value of the signal strength of the wireless beacon transmitted by the signal source.

Compared with the relevant art, according to the technical scheme disclosed by the embodiment of the disclosure, the image feature information collected by the camera is fused with the strength information of the wireless beacon to adjust and correct the recharging path, then the accumulated error of a single navigation technology is reduced, the image feature cooperates with the strength information of the wireless beacon to reduce the interference of a desktop environment, and then the accuracy and the fitness of a navigation algorithm are improved; and the map is constructed by combining with the visual navigation technology, the recharging direction is determined to eliminate obstacles, the recharging path is corrected by utilizing strength information of the wireless signals, thus the time for searching the recharging seat is further shortened, and the recharging success rate of the desktop robot in a small area range is improved.

In the embodiment, in the step A and the step E, the feature matching includes the operations that the center points of the images collected by the camera are selected to serve as the feature points of the environment images, the feature points may be SURF feature points, then a square frame is taken in the desktop environment of the feature points, and the side length of the frame is 20s (s is the scale where the detected feature points are located). The frame is divided into a first preset number of sub-regions, haar wavelet features of a second preset number of pixels in the horizontal direction and the vertical direction are counted in each sub-region, and the haar wavelet features are the sum of values in the horizontal direction, the sum of absolute values in the horizontal direction, the sum of absolute values in the vertical direction and the sum of absolute values in the vertical direction, that is, each sub-region has four values. The multi-dimensional vectors generated after calculation are the SURF feature descriptor of the images. In the embodiment, the SURF feature descriptors of the collected images are matched with the environment images in the built-in database of the desktop robot, the matching is carried out by calculating the Euclidean distance between the to-be-matched images and the feature descriptors corresponding to the built-in sample images in the desktop map database. The images with the maximum matching degree in the built-in desktop map database are obtained according to the Euclidean distance obtained through calculation, and the desktop map database stores environment image feature descriptors corresponding to all positions and circle center positions on a recharging circumference with the center of the base as the circle center and the preset length as the radius on the desktop where the robot body moves, and desktop coordinate values measured in advance in the actual environment, specifically, including the shape, length and width of the desktop, and coordinate information of all directions of the desktop. In the embodiment, the preset length is set between 8 and 15 cm. According to the feature matching method, the actual environment area related to the environment images to be matched is drawn close to the base, thus the searching area range of the base is narrowed, the follow-up planned path is further prevented from appearing at the edge position of the desktop, especially at the corner position, and the robot body of the desktop robot is effectively prevented from falling off at the edge position of the desktop.

It is to be noted that in order to obtain image features for feature matching, feature points of the images need to be extracted. Before that, the images need to be preprocessed and feature point detection and extraction are carried out to obtain coordinates of feature points of the images, so that feature matching is conveniently carried out on the images. The relation of corresponding points of the same object in the scene on the corresponding imaging planes under the two different visual angles of the camera is determined so as to obtain a parallax, which is the key for determining the coordinate distance information of the object in the three-dimensional world. To achieve the purpose, feature extracting is carried out on the images, and feature matching is then carried out, so that the parallax is obtained. Pixels of the images or a pixel set of abstract expression are all the features, and common matching methods include dot matching, linear matching and area matching. In general, large-scale features often contain rich information, and relatively, the number becomes very small, so the matching speed is high, which is an advantage. At the same time, the extraction and description of the features are complex, and the positioning precision is not ideal. However, the small-scale features have high positioning accuracy and are simpler to express and describe, although the number of the features is large, the amount of information is small, in order to achieve high matching accuracy, a strong constraint criterion needs to be found during feature matching, and a corresponding matching strategy is needed.

Figure 2:
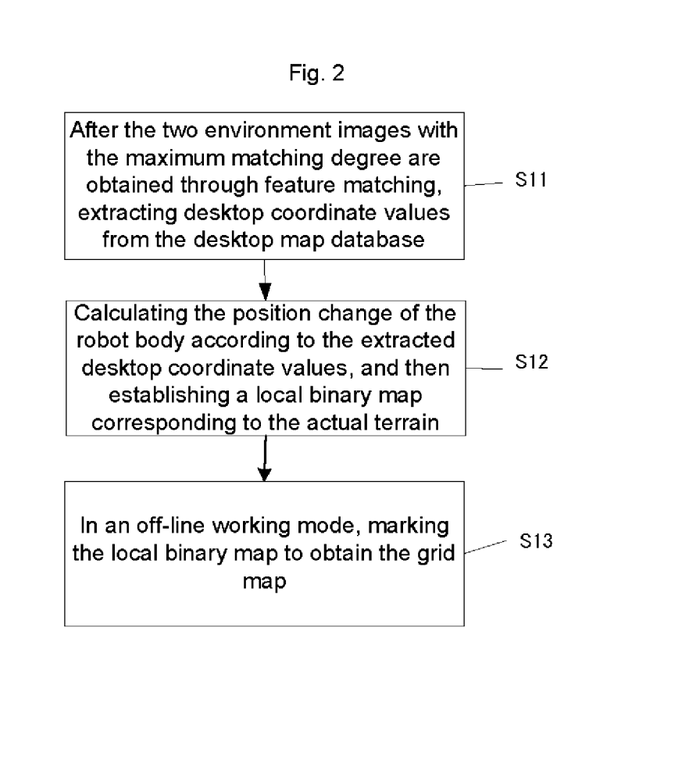
FIG. 2 is a flowchart of a method for constructing a grid map according to an embodiment of the disclosure.

Preferably, in S1, as shown in FIG. 2, the operation that the change of the position of the robot body is calculated, then a local map corresponding to the actual environment in the image is constructed includes the following steps.

In S11, the feature points of the collected two continuous frames of images are subjected to feature matching of the abovementioned embodiment to obtain two environment images with the maximum matching degree, corresponding desktop coordinate values are extracted from the desktop map database, sample images stored in the desktop map database are image information of all positions on a recharging circumference with the center of the base as the circle center and the preset length as the radius, so that the constructed map covering area is limited between the base and the robot body of the desktop robot.

In S12, the position change of the robot body is calculated according to the extracted desktop coordinate values, then a local binary map corresponding to the actual terrain is established, when the scene map is established, the two pictures are compared, and the objects are judged to be moving objects when the positions of the objects in the pictures are different. Specifically, position coordinates obtained through matching are converted into a global coordinate system from a local coordinate system, then the actual terrain is equivalent to each grid in the map according to a certain proportion, the size of each grid is adjusted according to coordinate values obtained through conversion, and two-dimensional data storage path information is established. In specific implementation, the embodiment of the disclosure does not limit the size of each grid in the map.

In S13, the local binary map is marked based on an off-line working mode to obtain the grid map. In the embodiment, when obstacles exist in a real terrain, the value of the grid is set to be 1, when the obstacles do not exist in the real terrain, the value of the grid is set to be 0, an m*n binary map, namely the grid map, is established according to the rule, in the grid map, when the value of the grid is 0, a carrier may pass through until the base is searched; when the value is 1, the machine may not pass through, when the value is N, the signal strength of the wireless beacon is detected in real time, and when the value is 1H, when signal strength of the wireless beacon reaches the maximum, the robot body of the desktop robot is in N-charging butt joint. According to the embodiment, at the local end of the robot body, feature points of two continuous frames of collected images are positioned, and the local binary map is established, so that a route from the current position to the position of the base is planned, namely, feasible routes are sequentially searched according to the sequence of upper, right, lower and left according to map information; and the searched paths are stored until reaching the base, so that accurate positioning is realized, and recharging path planning is facilitated.

Compared with the prior art, in S1, the base is equivalent to a transmitting base station of guide signals and is configured to modulate the transmitted wireless beacon; the robot body of the desktop robot receives the wireless beacon emitted by the base, the distance between a signal point and a receiving point is measured in a local master control system according to signal strength, and then the path is planned according to corresponding distance data. The recharging control method gets rid of cloud communication and cloud data analysis, the networking cost is saved, and the intelligent degree of recharging is improved.

Figure 3:
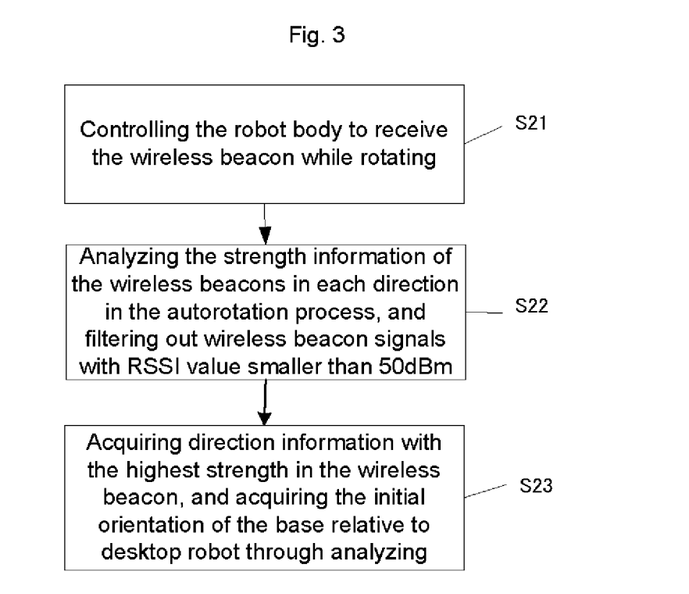
FIG. 3 is a flowchart of a method for determining the orientation of a base according to an embodiment of the disclosure.

Preferably, in S2, as shown in FIG. 3, the following steps are specifically included.

In S21, the robot body of the desktop robot is controlled to perform autorotation, and meanwhile, the wireless beacon modulated and transmitted by the base is received; and the desktop robot is controlled to perform autorotation by taking the center of the robot body as the center of a circle to distinguish the signal strength of the wireless beacon received at each angle, so that the direction of the wireless beacon with the highest strength is determined.

In S22, the strength information of the wireless beacons in each direction in the autorotation process is analyzed, and wireless beacon signals with RSSI value smaller than 50 dBm are filtered out, so that interference from wireless beacons other than the base are eliminated, and RSSI (Received Signal Strength Indication) refers to received signal strength indication. The RSSI technology is a positioning technology which measures the distance between a signal point and a receiving point of signal source according to the strength of a received signal and then carries out positioning calculation according to corresponding data; and the strength information of the wireless beacon includes an RSSI value.

In S23, direction information with the highest strength in the wireless beacon is acquired, the direction in which the signal strength of wireless beacon is the highest is determined, orientation of the base relative to an area where the robot body of the desktop robot is located is obtained through analyzing the RSSI value, and the orientation is taken as the initial orientation in the recharging path.

Compared with the prior art, the base orientation determining method disclosed in S2 uses the RSSI technology for positioning, the distance between a beacon node of a wireless signal transmitting source arranged on the base and a beacon receiving node of the current position of the robot body determines the precision of RSSI wireless positioning, in the embodiment of the disclosure, the precision of RSSI wireless positioning is set to be suitable for recharging path planning of the desktop robot in a small range area of the desktop, operation then resources of the robot for analyzing beacons and positioning a planned path are reduced, and the base searching efficiency of the wireless beacon is improved.

Figure 4:
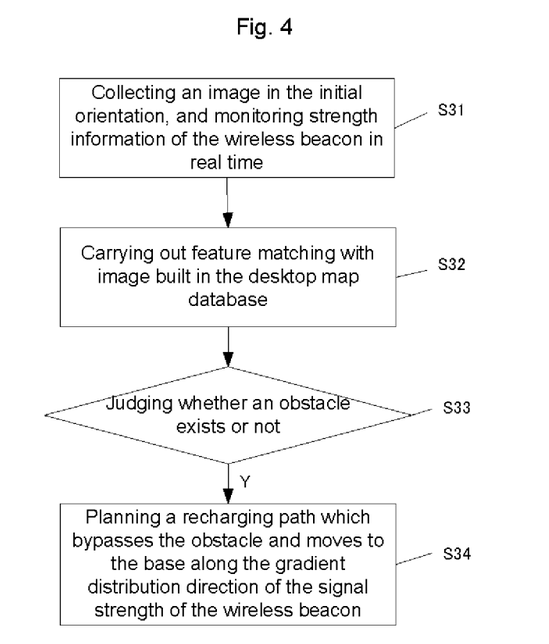
FIG. 4 is a flowchart of a method for planning a recharging path of a desktop robot according to an embodiment of the disclosure.

Preferably, in S3, as shown in FIG. 4, the operation that the recharging path is planned in the grid map includes the following steps.

In S31, the camera is called to acquire an image in the initial orientation, and the strength information of the wireless beacon received by the robot body of the desktop robot is monitored in real time.

In S32, feature matching is carried out on the images collected in real with an obstacle landmark image built in the desktop map database, and S33 is carried out; and the obstacle landmark image is further stored in the desktop map database.

In S33, whether an obstacle exists in the initial orientation or not is judged according to the images acquired by the camera in real time, and if so, S34 is carried out; otherwise, a recharging path with the signal strength of the wireless beacon in gradient enhancement is planned along the initial orientation until the signal strength at the beacon emission source of the base is maximum.

In S34, a recharging path which bypasses the obstacle and moves to the base along the gradient distribution direction of the signal strength of the wireless beacon is planned in the grid map by taking the current position of the robot body of the desktop robot as a starting point and the initial orientation as a forward direction; the obstacle is a non-closed space obstacle in the desktop area, the non-closed space obstacle in the step refers to the obstacle which may be bypassed so as to be different from closed space obstacles such as rooms, and the attributes of the obstacle may be distinguished through the camera of the desktop robot. Particularly, the robot body needs to turn in the process of bypassing the obstacle, due to the fact that the robot body is sensitive to position change sensing and the signal strength of the wireless beacon does not change in a gradient mode, the robot body may not perform recharging planning according to the initial orientation only by means of the gradient distribution direction of the signal strength, and the images collected by the camera need to be used for feature matching to achieve visual navigation obstacle avoidance. And after the robot body turns and bypasses the obstacle by adjusting the posture, the robot body continues to move to the base along the gradient distribution direction of the signal strength of the wireless beacon.

Compared with the prior art, the recharging path planning method disclosed in S3 is favorable for controlling the desktop robot to find the base more accurately and quickly. In the process of planning the recharging path, the gradient distribution of the signal strength of the wireless beacon is in gradient enhancement. The planning method of the recharging path is simplified, the searching time is further shortened, and the recharging success rate of the desktop robot is improved.

Figure 5:
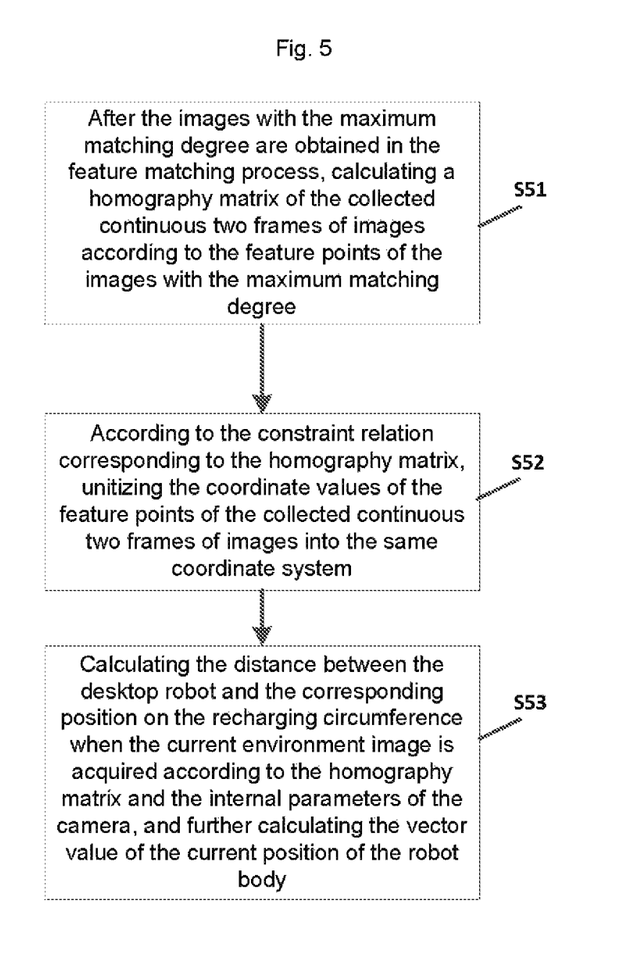
FIG. 5 is a flowchart of a method for calculating current position information of a robot body of a desktop robot according to an embodiment of the disclosure.

Preferably, in S5, due to the fact that the area range of the actual environment of the desktop is not large, the shooting distance of the camera is limited to be within 30 cm, the camera may meet the requirement of visual positioning under the condition that the imaging range is small, therefore, the depth of field of the images to be matched collected under the embodiment of the disclosure is small, a homography matrix may complete conversion of the images shot at different angles to the same visual angle, image splicing may be achieved, and then the map is constructed and the recharging path is planned. The internal and external parameters of the camera are calibrated by using a Zhang camera calibration method in advance.

In the embodiment, feature matching of the images is that the same object establishes a corresponding relation between two groups of images of corresponding imaging planes of the camera under two different visual angles, and the constraint relation between the two groups of images needs to be solved to further obtain a required basic matrix, and the basic matrix is a homography matrix in the embodiment. With the homography matrix, more matching point pairs may be obtained based on the homography matrix, so that the optimal recharging path is calculated and planned. It needs to be noted that selection of a correct matching algorithm is the key of successful matching, otherwise, mismatching may occur, even no matching may occur, as feature matching may be affected by many factors, as various noises often exist in nature, and factors such as illumination strength may also influence matching noise to a certain extent.

Specifically, when proceeding S5, the robot body of the desktop robot navigates within an area close to the highest signal strength of the wireless beacon, the precise position of the base needs to be searched by fine positioning, as shown in FIG. 5, the operation that the vector value of the current position of the robot body is calculated includes the following steps.

In S51, after the images with the maximum matching degree are obtained in the feature matching process of the collected two continuous frames of images, the pixel coordinates of one point in the same plane in the actual environment in two imaging planes of the moving camera may be obtained, then according to the coordinate values of the feature points of the images with the highest matching degree and the internal parameters of the camera, a homography matrix of the collected two continuous frames of images is calculated, so as to establish a mapping relation between an image coordinate system and a world coordinate system, the calculation method of the homography matrix is a classic algorithm and may be mastered by technical personnel in the field of machine vision, so that details are not described herein again.

In S52, the local coordinate system of the grid map is rotated according to the constraint relation corresponding to the homography matrix, and the coordinate values of the feature points of the collected two continuous frames of images are unified, which means that the world coordinate system where the object in the actual environment is located is mapped to the same coordinate system, images shot at different angles are converted to the same visual angle, image splicing may be achieved, information is continuously marked in the grid map, then the map is constructed, and the recharging path is planned while positioning is carried out.

In S53, the distance between the robot body of the desktop robot and the corresponding position on the recharging circumference when the current environment image is acquired is calculated according to the pinhole imaging principle and the uniformly processed coordinate values in combination with the homography matrix and the internal parameters of the camera, and further the vector value of the current position of the robot body is calculated. The pinhole imaging principle is to process the feature points of the collected two continuous frames of images on the geometric basis of similar triangles.

Compared with the relevant art, according to the calculating method disclosed in S5, the mapping relation of one point under the same plane in the actual environment under the two imaging planes of the moving camera is analyzed, so that two continuously collected images are converted to the same visual angle and then superposed together to be conveniently marked in the same grid map, and precise positioning operation of the desktop robot is completed within the error allowable range of the image resolution.

It needs to be noted that in the abovementioned embodiment, the positions of collected objects on the recharging circumference and the circle center relative to the camera are calculated according to the internal parameters of the camera, pixel coordinates of feature points on the collected images are converted into corresponding position coordinates on the grid map, then the moving path of the robot body of the desktop robot is obtained, the position of the camera in the environment may be calculated, that is, the position of the object on the recharging circumference and the circle center in the collected images in the environment may be calculated, therefore, the position of the object in a scene map is obtained, if the origin of coordinates of the object in the actual environment is calculated, the coordinates of the camera should be added, and finally, the coordinates of the collected object are calculated and marked in the coordinate system of the grid map. According to method, the position of the object collected in images relative to original point is calculated multiple times, and after multiple times of calculation, the coordinate system of the grid map has multiple points, namely, whole grid map may be established.

In the relevant art, an inertial navigation positioning technology is used for the recharging path, actually, the direction and distance information of a carrier are calculated through motion information of an inertial sensor, then the relative position of the carrier is obtained according to the initial position, and positioning and navigation of the carrier are realized. Because motion sensor devices forming the inertial navigation system are all installed in the carrier, the inertial navigation system does not depend on the external environment during operation, and does not radiate energy to the outside, so that the positioning method is not easily interfered, and the system is an autonomous navigation system based on the carrier itself. However, due to the fact that direction and position information is generated through integration, system errors may be increased along with time, and therefore, the long-term precision of inertial navigation is poor. The machine vision technology may adopt an OpenCV vision library and may also be replaced by other vision systems, and the machine learning algorithm may also have various algorithm names, such as TensorFlow, or a higher-level machine learning calculation algorithm with better flexibility and expansibility, and may also meet the requirements of the invention after being replaced.

The indoor positioning technology RSSI used in the disclosure may also be replaced by other indoor positioning technologies such as UWB. It is to be noted that although the accuracy of the RSSI has reached the required value, the RSSI may also be replaced with the wireless carrier communication technology UWB to increase the accuracy if the cost allows, but the wireless beacon is reserved as a unique identification code to improve the success rate of recharging guide. Finally, it should be noted that the above embodiments serve only to illustrate the technical solution of the disclosure and not to limit the same; although the disclosure has been described in detail with reference to preferred embodiments, it will be understood by those of ordinary skill in the art that modifications to the specific implementation modes of the disclosure or equivalents to some of the technical features can be made; without departing from the spirit of the technical scheme of the invention, all of them should be covered in the scope of the technical solutions claimed by the disclosure.

What is claimed is:

1. A recharging control method of a desktop robot, the desktop robot comprises a robot body provided with a camera and a base integrating charging and wireless beacon transmitting modulating functions, wherein the recharging control method comprises:
   step A, when the robot body of the desktop robot receives a charging instruction of a recharging mode, calling the camera to collect images of a desktop environment, controlling two continuous frames of the images to be subjected to feature matching, calculating position change of the robot body, and then constructing a corresponding grid map;

step B, controlling the robot body of the desktop robot to receive a wireless beacon modulated and transmitted by the base, and analyzing initial orientation of the base according to strength information of the wireless beacon;

step C, planning a recharging path in the grid map in combination with the position change of the robot body and the initial orientation obtained through analysis; and step D, controlling the robot body of the desktop robot to move along the recharging path;

step E, when the strength of the wireless beacon is within a preset threshold range, controlling the collected two continuous frames of images to be subjected to feature matching, then calculating a vector value of current position of the robot body, and further searching the base according to the vector value;

wherein a signal source for transmitting the wireless beacon is arranged on the base, and the preset threshold range is 80%-90% of the maximum value of the signal strength of the wireless beacon transmitted by the signal source; and the two continuous frames of images are images of the same object on imaging planes of the camera at different visual angles;

wherein in the step A and the step E, the feature matching comprises: selecting center points of the images collected by the camera to serve as feature points of environment images carrying out feature descriptor matching with the environment image in a desktop map database built in the desktop robot, so as to find the images with the maximum matching, the desktop map database stores environment image feature descriptors corresponding to all positions on a recharging circumference and a circle center position, and the recharging circumference takes the center position of the base as the circle center and a predetermined length as a radius on the desktop where the robot body moves, and desktop coordinate values measured in advance in an actual environment; wherein the predetermined length has the value of no more than 20 cm, wherein in step E, calculating a vector value of the current position of the robot body comprises: after the images with the maximum matching degree are obtained in the feature matching process of the collected continuous two frames of images, calculating a homography matrix of the collected continuous two frames of images according to the feature points of the images with the maximum matching degree and an internal parameters of the camera; according to constraint relation corresponding to the homography matrix, unitizing the coordinate values of the feature points of the collected continuous two frames of images into the same coordinate system; and calculating distance between the robot body of the desktop robot and the corresponding position on the recharging circumference when the current environment image is acquired according to a pinhole imaging principle and the coordinate values in combination with the homography matrix and the internal parameters of the camera, and further calculating the vector value of the current position of the robot body.

2. The recharging control method according to claim 1, wherein in step B, specifically comprising:
controlling the robot body of the desktop robot to rotate, and meanwhile, receiving the wireless beacon modulated and transmitted by the base;
analyzing strength information of the wireless beacons in each direction in autorotation process, and filtering out wireless beacon signals with RSSI value smaller than 50 dBm; and
acquiring direction information with the highest strength in the wireless beacon, and acquiring the initial orientation of the base relative to the robot body of the desktop robot through analyzing, wherein the strength information of the wireless beacon comprises an Received Signal Strength Indication (RSSI) value.

3. The recharging control method according to claim 2, wherein the position change of the robot body is calculated, and then a corresponding local map corresponding to actual environment in the images is constructed comprises:
after feature points of the collected two continuous frames of images are subjected to feature matching to obtain two environment images with the maximum matching degree, extracting desktop coordinate values of the actual environment corresponding to the two environment images from the desktop map database;
calculating the position change of the robot body according to the extracted desktop coordinate values, and then establishing a local binary map corresponding to an actual terrain; and
in an off-line working mode, marking the local binary map to obtain the grid map.

4. The recharging control method according to claim 1, wherein in step C, planning a recharging path in the grid map further comprises:
calling a camera to collect an image in the initial orientation, and monitoring strength information of the wireless beacon received by the robot body of the desktop robot in real time;
carrying out feature matching with an obstacle landmark image built in the desktop map database, and then judging whether an obstacle exists or not; and
when an obstacle exists in the initial orientation, planning the recharging path which bypasses the obstacle and moves to the base along gradient distribution direction of the signal strength of the wireless beacon in the grid map by taking the current position as a starting point and the initial orientation as a forward direction;
wherein obstacle landmark image is further stored in the desktop map database.

5. The recharging control method according to claim 4, wherein in the recharging path, gradient distribution of the signal strength of the wireless beacon is in gradient enhancement.

6. The recharging control method according to claim 1, wherein the robot body of the desktop robot comprises a processor and a beacon receiving device, the processor is electrically connected with the camera, the camera converts collected image data into electric signals and transmits the electric signals to the processor for image processing.

7. The recharging control method according to claim 6, wherein the processor is electrically connected with the beacon receiving device, and is configured to process the signal strength information received by the beacon receiving device and a unique identification code of the base.

* * * * *